# United States Patent Office 3,293,269
Patented Dec. 20, 1966

3,293,269
EPOXIDATION OF OLEFINS
Larry G. Wolgemuth, Fullerton, Calif., assignor to Union Oil Company of California, Los Angeles, Calif., a corporation of California
No Drawing. Filed Nov. 13, 1964, Ser. No. 411,090
8 Claims. (Cl. 260—348.5)

This invention relates to the preparation of olefin oxides and in particular prescribes a method for the preparation of olefin oxides using peroxide oxidants.

Olefins have been oxidized to olefin oxides by reaction with various organic peracids such as peracetic acid. Because of olefin oxide products are reactive with the organic acids, the yields of olefin oxides are decreased by this side reaction. Accordingly, the preparation of olefin oxides by oxidation of olefins with peracids is not highly efficient.

It is also known that various olefinic compounds having functional groups vicinal to the ethylenically unsaturated group such as alpha, beta-unsatured carboxylic acids and esters thereof can be oxidized to form the epoxide by reaction with peroxides, e.g., hydrogen peroxide in alkaline solutions. This reaction however depends upon the proximity of the carboxyl or carboxylate radical to the olefin bond to activate this bond sufficiently for oxidation by the peroxide. Heretofore, this reaction has not been successfully applied to the oxidation of hydrocarbon olefins which do not have the carboxyl radical adjacent the ethylenically unsaturated carbons.

It is an object of this invention to prescribe a method for the expoxidation of olefins.

It is an object of this invention to provide a catalyst and a reactant system including said catalyst which is useful for epoxidation of olefins.

It is also an object of this invention to prescribe a process for the epoxidation of olefins by oxidation of the olefin with a peroxide.

It is a further object of this invention to prescribe an epoxidation of olefins with a peroxide oxidant while avoiding the epoxide side reactions encountered in the prior art.

It is a further object of this invention to prescribe a method for the epoxidation of olefins that heretofore have been relatively inert to hydroperoxide epoxidation.

Other and related objects will be apparent from the following description.

I have now found that ethylenically unsaturated compounds can be readily oxidized to epoxide by contacting the ehtylenically unsaturated compound with a hydroperoxide and carbon dioxide under liquid phase conditions and in the presence of an alkaline material. The reaction can be performed under relatively mild conditions, including temperatures from about —50° to about 250° C. and pressures from about 100 to about 10,000 p.s.i.g. or more, sufficient to maintain liqiud phase conditions at the reaction temperature.

Since the reaction is not performed in the presence of reactive organic acids, the decomposition of the epoxide by reaction with such acid is avoided and hence, the major shortcomings of the prior art oxidation of olefins with peracids is avoided. Additionally, I have found that the presence of the carbon dioxide in the oxidation permits the epoxidation of hydrocarbon olefins that heretofore have been relatively refractory to oxidation with alkaline hydroperoxide solutions.

As described herein, my novel catalyst and reactant composition containing said catalyst comprises a reaction solvent which can be water or an organic solvent which is inert to the reactants and oxidation conditions, an alkaline material sufficient to provide the pH of said composition between about 6 and 12, from about 5 to 95 weight percent of a hydroperoxide which can be hydrogen peroxide or an organic hydroperoxide consisting of oxygen, hydrogen and carbon and having from 1 to about 20 carbons and saturated with carbon dioxide at a carbon dioxide partial pressure from about 100 to about 10,000 p.s.i.g. Preferably, hydrogen peroxide is used with reaction solvents containing water and the organic hydroperoxides are used with substantially anhydrous (less than about 25 percent water) organic solvents.

A wide variety of ethylenically unsaturated compounds can be epoxidized in accordance with my process. In general, any hydrocarbon olefin having from 2 to about 20 carbons can be oxidized. Preferably. olefins having from 2 to about 12 carbons are oxidized. The aliphatic hydrocarbon mono-olefins include: ethylene, propylene, butene-1, butene-2, isobutene, pentene-1, pentene-2, hexene, isohexene, heptene, 3-methylhexene-1, octene-1, isooctene, nonene, decene, dodecene, tridecene, pentadecene, octadecene, eicosene, docosene, tricosene, tetracosene, pentacosene, etc. Examples of hydrocarbon diolefins which can also be oxidized include: pentadiene, hexadiene, octadiene, decadiene, tridecediene, eicosadiene, tetracosadiene, etc. The alicyclic hydrocarbon olefins can also be oxidized such as cyclopentene, cyclohexene, cycloheptene, methycyclohexene, isopropylcyclohexene, butylcyclohexene, octaylcyclohexene, dodecylcyclohexene, etc.

The reaction is performed under liquid phase conditions and, preferably, the ethylenically unsaturated compound is employed in excess and conveniently serves as the reaction solvent. If desired, however, other solvents which are inert to the oxidation conditions can be employed such as the esters of aliphatic alcohols and carboxylic acids, hydrocarbons, saturated ethers and alcohols, water and mixtures thereof. In general, any organic liquid that is inert to the reactants and to the oxidation conditions can be employed for the reaction solvent in my invention. Generally it is convenient to employ organic liquids having from 1 to about 25 carbons; preferably solvents having from 1 to 6 carbons are used. Illustrative solvents of the aforementioned classes include the following esters: methyl acetate, ethyl acetate, n-propylpropionate, isopropyl acetate, ethylpropionate, n-butylbutyrate, sec-butyl acetate, isobutylacetate, ethyl-n-butyrate, n-butyl acetate, isoamyl acetate, n-amyl acetate, lycol diformate, furfural acetate, isoamyl n-butyrate, ethylacetyl acetate, diethyl oxalate, glycol diacetate, isoamyl isovalerate, n-dibutyl oxalate, etc.

Various aliphatic hydroxy compounds can be employed such as methanol, ethanol, propanol, isopropanol, butanol, isobutanol, amyl alcohol, isoamyl alcohol, hexanol, isohexanol, heptanol, isoheptanol, 3-methylhexanol-1, lauryl alcohol, 3,4-diethylheptanol-1, 4-ethylhexanol ethylene glycol, propylene glycol, etc.

Various ethers can also be employed including the ethers of the aforementioned aliphatic alcohols such as methyl ethyl ether, diethyl ether, dioxane, diisopropyl ether, diisoamyl ether, diethylene glycol diethyl ether, tetraethylene glycol dimethyl ether, ethyl heptyl ether, isobutyl amyl ether, lauryl ethyl ether, etc.

Hydrocarbons including the saturated and aromatic hydrocarbons can of course be employed as suitable inert solvents, e.g., pentane, hexane, heptane, octane, isooctane, decane, dodecane, kerosene, naphtha, benzene, xylene, toluene, cumene, isocumene, etc.

As previously mentioned, the reaction is performed under alkaline conditions wherein a suitable alkaline material, i.e., base, is employed in the reaction zone. In general, organic and inorganic bases can be used and these bases need not be soluble in the reaction solvent to be effective. The ammonium, alkali metal and alkaline earth metal hydroxides, alkoxides, and salts of weak organic and inorganic acids can suitably be employed. Examples of such alkaline materials include the following hydroxides: ammonium hydroxide, sodium hydroxide, potassium hydroxide, cesium hydroxide, lithium hydroxide, calcium hydroxide, magnesium hydroxide, barium hydroxide, etc. The oxides and alkoxides of any of the aforementioned alkali or alkaline earth metals and any of the aforementioned saturated alcohols can also be used as the alkaline material. Preferred alkoxides are those of the lower molecular weight alcohols, e.g., having 1 to about 6 carbons. Examples of oxides include sodium oxide, calcium oxide, magnesium oxide, etc. Examples of alkoxides include, e.g., sodium methoxide, lithium ethoxide, cesium isopropoxide, potassium butoxide, potassium isobutoxide, magnesium pentoxide, magnesium isoheptoxide, barium methoxide, etc.

The alkali and alkaline earth metal salts of weak inorganic acids which are known to exhibit alkaline pH values between 7 and 11 can also be employed including the salts of aliphatic and aromatic carboxylic acids such as sodium aceate, potassium propionate, lithium pentonate, lithium oxalate, potassium succinate, magnesium benzoate, lithium octanoate, sodium terephthalate, etc.

The alkaline material can also be an organic amine including the primary, secondary and tertiary aliphatic and alicyclic amines which, preferably, contain from 1 to about 15 carbon such as methyl amine, diethyl amine, isopropyl amine, triamyl amine, lauryl amine, isohexyl amine, cyclohexyl amine, etc. Heterocyclic amines are also alkaline substance and can be used such as pyrroline, pyrrolidine, pyridine, dihydropyridine, tetrahydropyridine, piperidine, indole, dihydroindole, tetrahydroindole, indolane, isoindole, dihydroisoindole, tetrahydroisoindole, quinoline, dihydroquinoline, tetrahydroquinoline, octahydroquinoline, decahydroquinoline, isoquinoline, dihydroisoquinoline, tetrahydroisoquinoline, octahydroisoquinoline, decahydroisoquinoline, etc., as well as the lower alkyl derivatives thereof such as methylpyrroline, ethylpyridine, isopropylpiperidine, amylindole, etc.

A source of alkalinity can also comprise the various anion exchange resins which are charged with soluble anions such as halides, e.g., chloride, bromide, fluoride anions or nitrate, sulfate, etc., anions. Examples of suitable base exchange resins are: amination products of chloromethylated styrene-divinylbenzene copolymers marketed by Rohm & Haas as "Amberlite IRA-400" and "IRA-401" made by reacting formaldehyde, melamine and diethylenetriamine; resins having quaternary ammonium groups linked to polystyrene which has been crosslinked with divinyl benzene marketed by Dow Chemical Company as "Dowex-1" and "Dowex-2" and resins having polyalkylamine groups linked to a polystyrene-divinyl benzene matrix marketed by Dow Chemical Company as "Dowex-3."

As previously mentioned, the amount of alkaline material should be sufficient to buffer the system pH between about 6.0 and 11.0; preferably from about 7.5 to 10.0. Such amount of alkaline material will comprise from about 10 to 500 parts by weight per 100 parts of the reaction system, i.e., sum of solvent and hydroperoxide. Preferably from about 10 to about 100 parts per 100 parts of system are used with soluble alkaline materials and larger amounts, e.g., from 75 to 500 parts per 100 parts are used with the insoluble alkaline materials such as the anion exchange resins.

The reaction is performed in the presence of a hydroperoxide which can be hydrogen peroxide or an organic peroxide which preferably has 1 to about 20 carbons and consists of hydrogen, carbon and oxygen. Examples of suitable organic peroxides are as follows: methyl hydroperoxide, ethyl hydroperoxide, propyl hydroperoxide, isopropyl hydroperoxide, allyl hydroperoxide, butyl hydroperoxide, sec-butyl hydroperoxide, t-butyl hydroperoxide, amyl hydroperoxide, 1-methylbutyl hydroperoxide, diethylmethyl hydroperoxide, methyl, isopropylmethyl hydroperoxide, t-pentyl hydroperoxide, 1,1,2-trimethylpropyl hydroperoxide, n-hexyl hydroperoxide, 1-methylamyl hydroperoxide, 1-ethylbutyl hydroperoxide, 1,1-dimethylbutyl hydroperoxide, cyclohexene hydroperoxide, cyclohexyl hydroperoxide, 2-t-butylallyl hydroperoxide, n-heptyl hydroperoxide, 1-methylhexyl hydroperoxide, 1,1,2,2-tetramethylpropyl hydroperoxide, 1-methyl-1-ethylbutyl hydroperoxide, triethylmethyl hydroperoxide, 1,1-diethylpropyl hydroperoxide, methyl, phenylmethyl hydroperoxide, 1-ethylcyclohexyl hydroperoxide, n-octyl hydroperoxide, 1-methylheptyl hydroperoxide, 1-methyl-1-ethylamyl hydroperoxide, methyl,ethyl,t-butylmethyl hydroperoxide, ethyl,phenylmethyl hydroperoxide, dimethyl, phenylmethyl hydroperoxide, n-nonyl hydroperoxide, 1,2,3,4-tetrahydro-1-naphthyl hydroperoxide, 1,2,3,4-tetrahydro-1-methylnaphthyl hydroperoxide, propyl, phenylmethyl hydroperoxide, methyl,ethyl,phenylmethyl hydroperoxide, trans-decalin hydroperoxide, hexahydro-3a-indanyl hydroperoxide, 1-indanyl hydroperoxide, 9-fluorenyl hydroperoxide, n-decyl hydroperoxide, 1-phenylcyclohexyl hydroperoxide, lauryl hydroperoxide, benzyl hydroperoxide, p-methylbenzyl hydroperoxide, α-p-xylyl hydroperoxide, cumene hydroperoxide, α-methyl-α-ethylbenzyl hydroperoxide, t-butylisopropenyl hydroperoxide, eicosyl hydroperoxide, ethyl,diphenylmethyl hydroperoxide, n-hexadecyl hydroperoxide, etc.

The following compositions in parts by weight are illustrative of the reactant compositions useful in my invention (the alkaline materials being expressed in parts per 100 parts of the sum of the solvent and hydroperoxide):

COMPOSITION 1

| | Parts by weight |
|---|---|
| Methyl acetate | 80 |
| Water | 15 |
| Methyl hydroperoxide | 5 |
| Sodium hydroxide | 15 |

$CO_2$ pressure, 100 p.s.i.g.

COMPOSITION 2

| | |
|---|---|
| Sec-butyl acetate | 30 |
| Water | 60 |
| 1-methylbutyl hydroperoxide | 10 |
| Barium hydroxide | 17 |

$CO_2$ pressure, 150 p.s.i.g.

COMPOSITION 3

| | |
|---|---|
| Diethyl oxalate | 80 |
| Amyl hydroperoxide | 20 |
| Ammonium hydroxide | 10 |

$CO_2$ pressure, 3000 p.s.i.g.

COMPOSITION 4

| | |
|---|---|
| Glycol diformate | 75 |
| Cyclohexyl hydroperoxide | 25 |
| Cesium hydroxide | 22 |

$CO_2$ pressure, 450 p.s.i.g.

COMPOSITION 5

| | |
|---|---|
| Amyl alcohol | 50 |
| t-Butyl hydroperoxide | 50 |
| Sodium pentoxide | 10 |

$CO_2$ pressure, 125 p.s.i.g.

COMPOSITION 6

| | |
|---|---|
| Lauryl alcohol | 80 |
| n-Octyl hydroperoxide | 20 |
| Potassium carbonate | 25 |

$CO_2$ pressure, 600 p.s.i.g.

COMPOSITION 7

| | |
|---|---|
| Methyl ethyl ether | 60 |
| Eicosyl hydroperoxide | 40 |
| Dipotassium succinate | 20 |

$CO_2$ pressure, 900 p.s.i.g.

COMPOSITION 8

| | Parts by weight |
|---|---|
| Diisopropyl ether | 10 |
| Triethylmethyl hydroperoxide | 90 |
| Isopropyl amine | 15 |

$CO_2$ pressure, 1500 p.s.i.g.

COMPOSITION 9

| | |
|---|---|
| Tetraethylene glycol dimethyl ether | 65 |
| Allyl hydroperoxide | 35 |
| Triamyl amine | 50 |

$CO_2$ pressure, 500 p.s.i.g.

COMPOSITION 10

| | |
|---|---|
| Lauryl ethyl ether | 75 |
| n-Decyl hydroperoxide | 25 |
| Piperidine | 20 |

$CO_2$ pressure, 10,000 p.s.i.g.

COMPOSITION 11

| | |
|---|---|
| Heptane | 20 |
| Cyclohexane hyproperoxide | 80 |
| Ethylpyridine | 35 |

$CO_2$ pressure, 700 p.s.i.g.

COMPOSITION 12

| | |
|---|---|
| Decane | 15 |
| Lauryl hydroperoxide | 85 |
| Quinoline | 20 |

$CO_2$ pressure, 850 p.s.i.g.

COMPOSITION 13

| | |
|---|---|
| Kerosene | 90 |
| Benzyl hydroperoxide | 10 |
| Aberlite IRA–400 | 350 |

$CO_2$ pressure, 1750 p.s.i.g.

COMPOSITION 14

| | |
|---|---|
| Toluene | 50 |
| Cumene hydroperoxide | 50 |
| Dowex-3 | 200 |

$CO_2$ pressure, 5000 p.s.i.g.

COMPOSITION 15

| | |
|---|---|
| Naphtha | 25 |
| Tetralin hydroperoxide | 75 |
| Dowex-1 | 475 |

$CO_2$ pressure, 7500 p.s.i.g.

In practice, the epoxidation can be effected by introducing the olefin into contact with any of the aforementioned compositions at temperatures from about −50° to about 250° C. and at the indicated pressures. Preferably, temperatures from about 0° to about 30° C. are used.

The reaction can be practiced in a batchwise or continuous fashion by continuously introducing the reactants to the reaction zone or by charging the reaction zone, and pressuring the reactant to the desired temperature with carbon dioxide and, if desired, an inert gas such as argon, nitrogen, etc. Sufficient time is permitted to insure completion of the reaction and the progress of the reaction can be monitored by sampling of the reactant and analysis by various means, e.g., gas chromatography or analysis of the epoxide group or analysis for the disappearance of the ethylenically unsaturated group.

Upon completion of the reaction all or a portion of the liquid phase reactants are removed and the product recovered by conventional techniques, e.g., solvent extraction or distillation.

The following examples will serve to illustrate a mode of practicing of my invention and to demonstrate the results that can be obtained thereby.

Example 1

To a 2 liter, stainless steel autoclave were added 300 milliliters methanol, 100 milliliters of an aqueous 30 percent hydrogen peroxide solution, 10 grams potassium carbonate and 70 milliliters cyclohexene. The autoclave was pressured to 400 p.s.i.g. with carbon dioxide and the reaction mixture stirred for 18 hours at room temperature. The reaction mixture was then poured into 500 milliliters of water and the organic layer separated therefrom. The aqueous layer was extracted with an equal volume of benzene and the benzene raffinate was combined with the initial organic solution. This mixture was washed once with water then dried over magnesium sulfate. The material was analyzed by gas chomatography to indicate that 5.8 grams of cyclohexene oxide were obtained. When the reaction was repeated with 100 milliliters of 1-octene in 300 milliliters of dioxane, 1,2-epoxy octane was obtained.

Example 2

To a 2 liter, stainless steel autoclave were added 300 milliliters methanol, 100 milliliters of an aqueous 30 percent hydrogen peroxide solution, 10 grams potassium carbonate and 70 milliliters cyclohexene. The autoclave was pressured to 700 p.s.i.g. with carbon dioxide and the reaction mixture stirred for 18 hours at room temperature. The reaction mixture was then analyzed by gas chromatography. Analysis showed the presence of 13 grams of cyclohexene oxide.

Example 3

To a one-half gallon titanium autoclave were added 200 milliliters of 30 percent aqueous hydrogen peroxide, 200 milliliters of methanol, 10 grams of potassium bicarbonate and 300 grams of propylene. The autoclave was then pressured to 800 p.s.i.g. with $CO_2$ and the reaction mixture stirred for seven hours at room temperature. Gas chromatography analysis showed the presence of 4 grams of propylene oxide.

Example 4

In an identical matter as described in Example 3, 200 grams of 2-butene were reacted with 30 percent hydrogen peroxide and carbon dioxide. Gas chromatography analysis showed that 5 grams of 2,3-butene oxide had been formed.

Example 5

Using a procedure identical to that described in Example 2, 70 grams of dicyclopentadiene were reacted with 30 percent aqueous hydrogen peroxide and $CO_2$. Gas chromatographic analysis of the reaction mixture showed that 26.8 grams of dicyclopentadiene monoxide had been formed.

The preceding examples are intended solely to illustrate a mode of practicing of the invention and to demonstrate results obtainable thereby. It is not intended that the invention be unduly limited by these examples but, rather, that the invention be defined by the compositions having the components or their obvious equivalents, and the methods having the method steps or their obvious equivalents set forth in the following claims.

I claim:
1. The epoxidaion of a hydrocarbon olefin having 2 to about 20 carbons that comprises introducing said olefin and carbon dioxide into contact, under epoxidation conditions, with a reaction medium comprising a reaction solvent selected from the class consisting of water and organic solvents inert to said reaction under said epoxidation conditions containing:
   (1) from 5 to about 95 weight percent of a hydroperoxide selected from the class consisting of hydrogen peroxide and organic hydroperoxides consisting of hydrogen, carbon and oxygen and having from 1 to about 20 carbons;
   (2) from about 10 to 500 parts by weight per 100 parts of said solvent and hydroperoxide of an alkaline material, sufficient to maintain the pH of said reaction medium between about 6 and 11; and said epoxidition conditions comprising temperatures from −50° to 250° C. and pressures from about 1 to 10,000 p.s.i.g.

2. The method of claim 1 wherein said solvent is water and said hydroperoxide is hydrogen peroxide.

3. The method of claim 1 wherein said solvent is an aliphatic alcohol having 1 to about 6 carbon and said hydroperoxide is hydrogen peroxide.

4. The method of claim 1 wherein said alkaline material is from 75 to 500 parts by weight per 100 parts of solvent and hydroperoxide of an anion exchange resin.

5. The method of claim 1 wherein said alkaline material is from 10 to 100 parts by weight per 100 parts of solvent and hydroperoxide of an alkali metal carbonate.

6. The oxidation of claim 1 wherein said hydrocarbon olefin has from 2 to about 12 carbons.

7. The oxidation of claim 1 wherein said hydrocarbon olefin is propylene.

8. The oxidation of claim 1 wherein said hydrocarbon olefin is cyclohexene.

No references cited.

WALTER A. MODANCE, *Primary Examiner.*

N. S. MILESTONE, *Assistant Examiner.*